(12) United States Patent  (10) Patent No.: US 7,046,652 B2
Hyun et al.  (45) Date of Patent: May 16, 2006

(54) SYSTEM AND METHOD OF A STACKABLE WIRELESS INTERNET PROTOCOL BASE STATION

(75) Inventors: SangKyoon Hyun, Santa Clara, CA (US); Ki-Hyun Joo, San Jose, CA (US); Chol Su Kang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 09/757,732

(22) Filed: Jan. 9, 2001

(65) Prior Publication Data

US 2002/0089951 A1 Jul. 11, 2002

(51) Int. Cl.
*H04B 7/216* (2006.01)

(52) U.S. Cl. ............... 370/342; 370/400; 455/524; 455/561

(58) Field of Classification Search ............ 370/328, 370/338, 340, 342, 352–356, 401, 335, 400; 455/524, 561
See application file for complete search history.

(56) References Cited

U.S. PATENT DOCUMENTS

| 5,600,633 | A * | 2/1997 | Jaisingh et al. ............ 370/277 |
| 6,307,837 | B1 * | 10/2001 | Ichikawa et al. ........... 370/230 |
| 6,400,966 | B1 * | 6/2002 | Andersson et al. ......... 455/561 |
| 6,407,996 | B1 * | 6/2002 | Witchalls ................... 370/352 |
| 6,452,915 | B1 | 9/2002 | Jorgensen .................. 370/338 |
| 6,487,406 | B1 * | 11/2002 | Chang et al. ............. 455/422.1 |
| 6,594,246 | B1 | 7/2003 | Jorgensen .................. 370/338 |
| 6,600,734 | B1 * | 7/2003 | Gernert et al. ............. 370/352 |
| 6,661,784 | B1 * | 12/2003 | Nykanen .................... 370/338 |
| 6,665,291 | B1 | 12/2003 | Shahdad et al. ............ 370/352 |
| 6,680,922 | B1 | 1/2004 | Jorgensen .................. 370/328 |
| 6,697,355 | B1 * | 2/2004 | Lim .......................... 370/352 |
| 6,721,306 | B1 * | 4/2004 | Farris et al. ................ 370/352 |
| 6,725,056 | B1 | 4/2004 | Moles et al. ................ 455/524 |
| 6,728,215 | B1 | 4/2004 | Alperovich et al. ........ 370/252 |
| 6,904,024 | B1 * | 6/2005 | Boch et al. ............. 370/310.1 |
| 2002/0097718 | A1 * | 7/2002 | Korus et al. ................ 370/390 |
| 2002/0118665 | A1 * | 8/2002 | Cleveland et al. ......... 370/342 |
| 2002/0123365 | A1 * | 9/2002 | Thorson et al. ............ 455/524 |
| 2003/0119500 | A1 * | 6/2003 | Mukherjee et al. ........ 455/433 |
| 2004/0077349 | A1 * | 4/2004 | Barak et al. ................ 455/436 |

FOREIGN PATENT DOCUMENTS

WO WO 9948228 * 9/1999

OTHER PUBLICATIONS

Harry Newton, "Newton's Telecom Dictionary," Sep. 1995, Flatiron Publishing, Inc, 9th Edition, p. 1098.*

* cited by examiner

*Primary Examiner*—Ricky Q. Ngo
*Assistant Examiner*—Nittaya Juntima
(74) *Attorney, Agent, or Firm*—Baker Botts L.L.P.

(57) ABSTRACT

A wireless office communication system including a multi-protocol, multi-sector wireless internet base station (WIBS) encompassing a base station controller, a mobile switch controller and an Ethernet interface module for coupling the WIBS to an existing internet protocol (IP) based network. The interface module provides for coupling the WIBS to an Ethernet back-bone, a mobile communication unit and a public switch telephone network (PSTN). In one embodiment of the invention, stackable base modules including a transceiver, channel elements and an Ethernet interface unit are integrated in a base station to provide scalability of an enterprise wireless network.

11 Claims, 4 Drawing Sheets

SYSTEM AND METHOD OF A STACKABLE WIRELESS INTERNET PROTOCOL BASE STATION

FIELD OF THE INVENTION

The present claimed invention relates generally to the field of wireless communication systems. More particularly, the present claimed invention relates to code division multiple access (CDMA) communication systems.

BACKGROUND ART

As the telecommunication industry prepares to deliver multimedia services to enterprise, residential and other commercial establishments via wireless access technologies, there arises the need for wireless base station architecture that can efficiently provide these services over a wide range of geographical areas.

FIG. 1 shows a representation of a telecommunications network comprising base stations 120, mobile switching center (MSC) 130, public switching network 140 and mobile terminals 150. Network 100 is designed to support communications to and from remotes terminals 150 that are located within coverage area of base stations 120. For example, if the remote terminals are mobile/cellular telephone then the network supports telephone communications to and from mobile phone users located within the network.

Base stations 120 are preferably distributed to provide seamless coverage. That is, base stations 120 are located such that, at any location within a total coverage range of the network, a remote terminal will be able to communicate with at least one base station.

FIG. 2 shows a representation of a network having a base station distributed in a manner to provide seamless coverage over the entire network range. The effective range of each base station 120 in network 100 is shown as a circle and is referred to as a cell site.

In FIG. 2, base stations 120 overlap and there are no locations within the interior of the network that are not covered by at least one base station. As shown in FIG. 2, some locations may be able to communicate with two different base stations, while other locations may be able to communicate with three different base stations.

The network 100 shown in FIG. 2 may use the IS-95 communication scheme which is based on code division multiple access (CDMA) modulation. According to the IS-95 standard for CDMA systems, each base station 120 is assigned a different pseudo noise (PN) offset to allow each base station to support different code channels. For example, each base station can support up to 64 different code channels with each channel being assigned one of 64 different CDMA sequences.

Under the IS-95 standard, for each omni-directional base station with one carrier, a forward link (transmissions from base station to mobile terminal) may have up to 61 traffic channels with one pilot sync and paging channel. Similarly, a reverse link (transmissions from mobile terminal to base station) also may have up to 63 traffic channels with one or more access channels. Each of the traffic channels is identified by a distinct user long code sequence and each access channel is identified by a distinct access channel long code sequence.

The availability of all these traffic channels in a base station introduces interference between the channels. The interference level increases as more channels are assigned until the level of interference adversely affects the integrity of the communications. Depending upon the circumstances, the interference can limit the number of mobile terminals capable of being supported at one time by a single base station.

One conventional solution for increasing base station capacity (as well as coverage area) relies on sectorizing. In sectorization, omni-directional cell sites are divided into multiple sectors to achieve the desired capacity and coverage. Sectorization provides a way to divide the total number of users into smaller groups. A sectorized antenna system uses directional antennas to divide the cell sites.

FIG. 3 is an exemplary illustration of a sectorized network in which each cell site 310, 320 and 330 is divided into sectors A–C. Each sector is assigned a different PN offset to handle mobile terminals within the sector. Each sector is given a different PN offset and its own pilot channel. Thus, in FIG. 3, each cell site 310, 320 and 330 transmits a corresponding number of different pilot channels, for each corresponding sector. Since each sector of a given cell site has its own PN offset, each sector is capable of supporting 64 different code channels. As a result, the sectorization scheme in FIG. 3 increases the number of remote mobile terminals that can be supported by a single base station.

FIG. 4 is an exemplary illustration of a conventional base station with multi-sector transmission capability. The base station shown in FIG. 4 supports the conventional circuit switching network implementation of the prior art. Base station 410 includes transceivers 420–424, channel cards 430–433, analog cards 440–443 and trunk cards 450–453. Base station 410 has multiple digital trunks to handle voice and data traffic for a multi-carrier and multi-sector cell site. Base station 410 is large enough to accommodate the maximum number of T1 digital trunks for specified maximum number of sectors and carriers. Base station 410 further has processing capabilities for specified maximum sectors and carriers.

For example, a 15 MHZ block in a PCS frequency band can include 11 CDMA carriers and each carrier can have up to 3 sectors. Thus, base station 410 would have about 11 T1 trunks for a large cell site. This also requires the base station to have enough rack space to accommodate other hardware resources such as channel cards, transceivers etc. Although having sectorizing capabilities enable the base station to support multiple remote terminals, the base station shown in FIG. 4 has the disadvantages of being too bulky, costly and not scalable.

With the shift in the paradigm from conventional circuit-switched and voice-oriented wireless applications to packet-switched and high speed data-oriented wireless applications, it is essential to find cost-effective and modular approaches to build base stations which are easily scalable to handle multi-sector/multi-carrier that handle high capacity multi-media information.

Thus, it is desirable to have a system and a method for handling remote access requests to a CDMA wireless enterprise system for system operation and maintenance management. There is a further desire to have a system for transmitting CDMA calls including voice and data over a communication pathway with a higher bandwidth such as the internet. It is further desirable to have a CDMA system that handles the transmission of calls, especially data calls, without the inherent difficulties of using a variety of transmission protocols for the same call. A need further exists for improved and less costly system which improves efficiency and the transmission rate and time of calls between a mobile unit and a base station and between base stations and a base station controller and between adjacent base stations.

SUMMARY OF INVENTION

The present invention is directed to a system and a method for providing an enterprise in-building or campus-wide IP based code division multiple access (CDMA) wireless system. The present invention is capable of handling both voice and data transmission over an internet protocol local access network within the CDMA system without the inherent delays and signal quality degradation encountered by conventional CDMA systems. The present invention further provides a system and method of providing a scalable sectorized or multi-carrier wireless base station for a CDMA network.

Embodiments of the invention include a system for a wireless base station with stackable base modules which couple to existing local area networks (LAN) within an enterprise to provide remote access to mobile wireless terminals with the convenience to communicate over existing Ethernet back-haul.

In one embodiment of the present invention the stackable base module includes a transceiver for handling analog communication signals, channel elements which handle digital communication signals and an Ethernet interface card which couples the base station to existing enterprise networks which enable the CDMA network to utilize existing packet switching protocols to transmit voice and data signals.

In the present invention the base station is completely scalable and can be stacked up with as many base modules as a multi-sector or multi-carrier cell site requires. For example, for a cell site of 3-sectored 2 carriers, six base modules could be stacked up in the base station to handle the communications needs of mobile terminals (e.g. cellular phone and other wireless devices) which relies on that particular base station.

The present invention provides an implementation advantage over the prior art by installing T1 trunk cards in existing commercial gateways such as a public switched network gateway to take advantage of the capacity and availability of such gateways. These commercial gateways are modular and therefore provide the advantage of being scalable. The ability to have scalable modular units provides the present invention the advantage of being less costly, less bulky and the ease to sectorized communications for cell sites utilizing the invention.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

Prior Art

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The invention is directed to a system, an architecture, subsystem and method to manage a wireless CDMA data communication in a way superior to the prior art. In accordance with an aspect of the invention, a base station allows CDMA call coverage within a building without requiring a dedicated and a lengthy end-to-end transmission.

In the following detailed description of the present invention, a system and method for a wireless internet protocol based communication system is described. Numerous specific details are not set forth in order to provide a thorough understanding of the present invention. However, it will be recognized by one skilled in the art that the present invention may be practiced without these specific details or with equivalents thereof.

Generally, an aspect of the invention encompasses providing an integrated wireless internet protocol based in-building or campus-wide CDMA communication system which provides a wide range of voice, data, video and other services in conjunction with a private branch exchange interfaced to the Public Switched Telephone Network (PSTN) and the Public Land Mobile Network (PLMN). The invention can be more fully described with reference to FIGS. 5 through 7.

Figure 5:
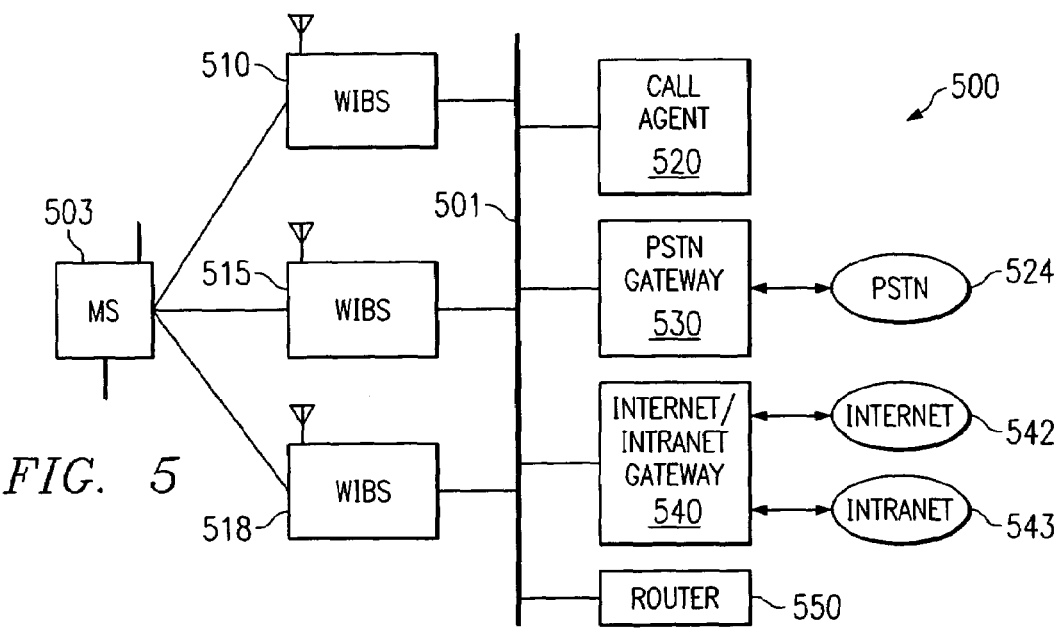
FIG. 5 is a block diagram of an embodiment of the enterprise wireless CDMA system of the present invention.

FIG. 5 is a functional illustration of the wireless system of the present invention. Wireless System 500 (WS) comprises, one or more mobile or wireless communication units 503, a plurality of enterprise wireless base stations (WIBS) 510, 515 and 518, a Call Agent 520 coupled to an Ethernet backbone of the LAN 501, a public switched telephone network gateway 530 (PSTN) which further couples to the Public Switched Telephone Network 524, an internet/intranet gateway 540 which couples to the internet 542 and an enterprise intranet 543.

Still referring to FIG. 5, WIBS 510 is an IP based system which enables WS 500 to take advantage of existing networking infrastructure in an office building or a similar environment to communicate wireless calls from the mobile units to other wireless devices on the network, internet or to the PSTN. WIBS 510 is an inexpensive scalable base station which enables WS 500 to provide wireless services to remote terminals. WIBS 510 includes switching functions to process traffic from various sources such as voice and data for delivery over the Ethernet back-bone. Integration of base station controller and mobile switch controller functions enables WIBS 510 to manage and coordinate radio resources to effect operations such as call origination, terminations and handoffs.

WIBS 510 further provides an interface between a CDMA PCS or a cellular mobile communication system and components of WS 500 to enhance mobility within a wireless office environment covering hot spots or dead spots traditional public cellular or PCS networks such as on-campus, or the load etc. could not address.

WIBS 510 is coupled to the Ethernet back bone preferably through a 10/100 base-T interface and related software stack to handle data burst on the LAN that traditional CDMA systems could not handle. WIBS 510 receives and sends data to and from cellular regions to other subscription units in the WS 500. WIBS 510 receives radio signals from mobile units and packetizes the contents of the signals into data packets that are delivered over the Ethernet back-bone to various destinations such as the PSTN and the internet.

Still referring to FIG. 5, WS 500 further includes a wireless internet server (WIS) 540 which couples to Ethernet back-bone 501 to provide directory registry functionality to mobile units communication with WS 500. In the preferred embodiment of the present invention, WIS 540 integrates both base station controller and mobile switch controller functionality to enable WIS 540 to manage calls received by WS 500.

Referring still to FIG. 5, gateway 530 is coupled to the Ethernet back-bone 501 to receive converted voice signals with WS 500 from WIBS 510 for delivery to the PSTN. In the present invention gateway 530 preferably is a PSTN or Trunk gateway manufactured by CISCO SYSTEMS.

Router 550 is also coupled to the Ethernet back-bone 501 to receive and deliver data packets from WIBS 510 to mobile units coupled to the internet or intranet requiring data traffic from WIBS 510. In the preferred embodiment router 550 may be any of the routers manufactured by CISCO SYSTEMS.

Figure 1:
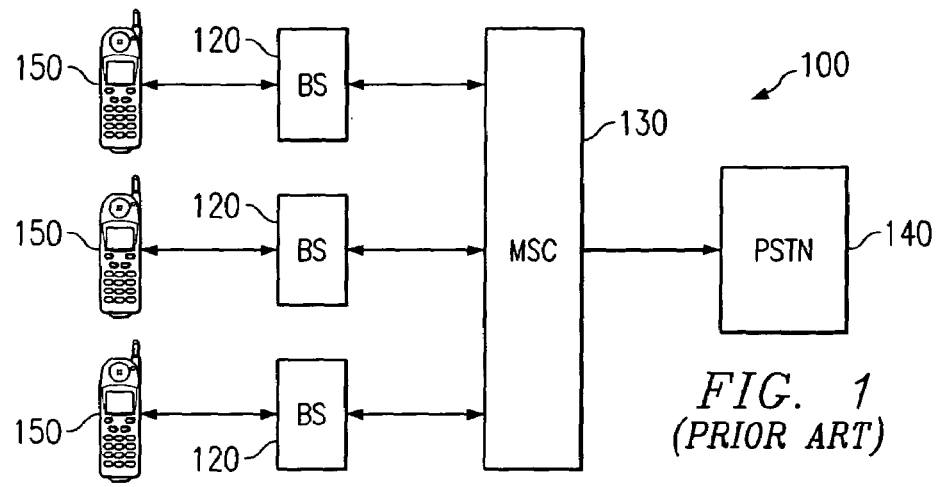
FIG. 1 is a block diagram of a conventional code division multiplex access (CDMA) system.
Figure 2:
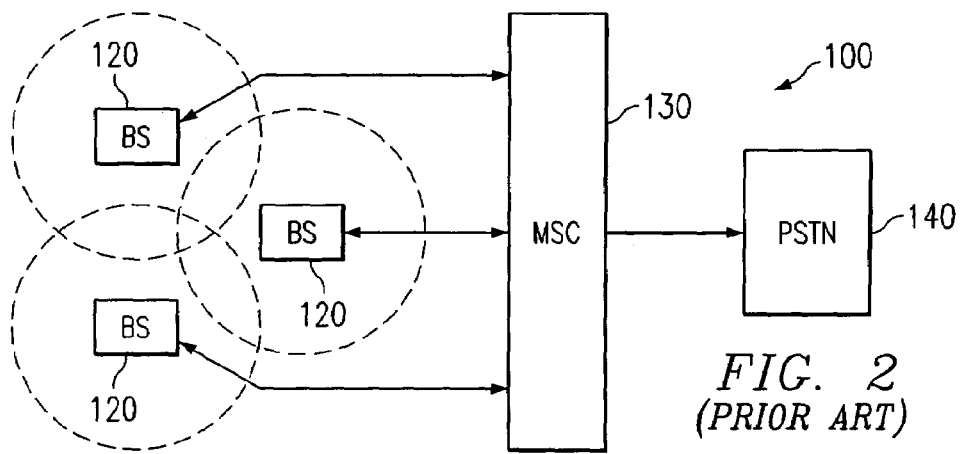
FIG. 2 is a block diagram of an implementation of a prior art sectorized CDMA system.
Figure 3:
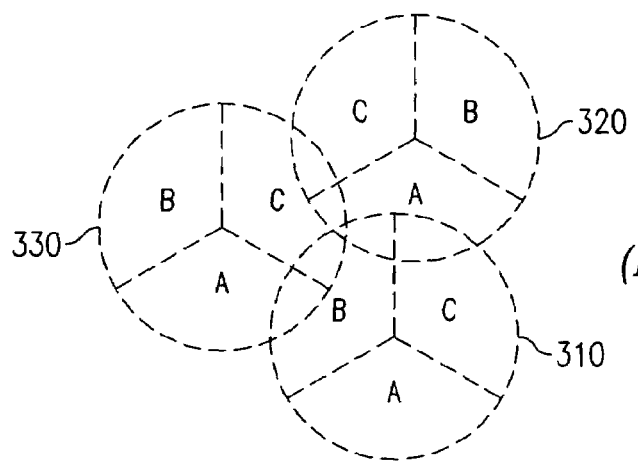
FIG. 3 is a block diagram of a sectorization scheme for cell sites of base stations of FIG. 2.
Figure 4:
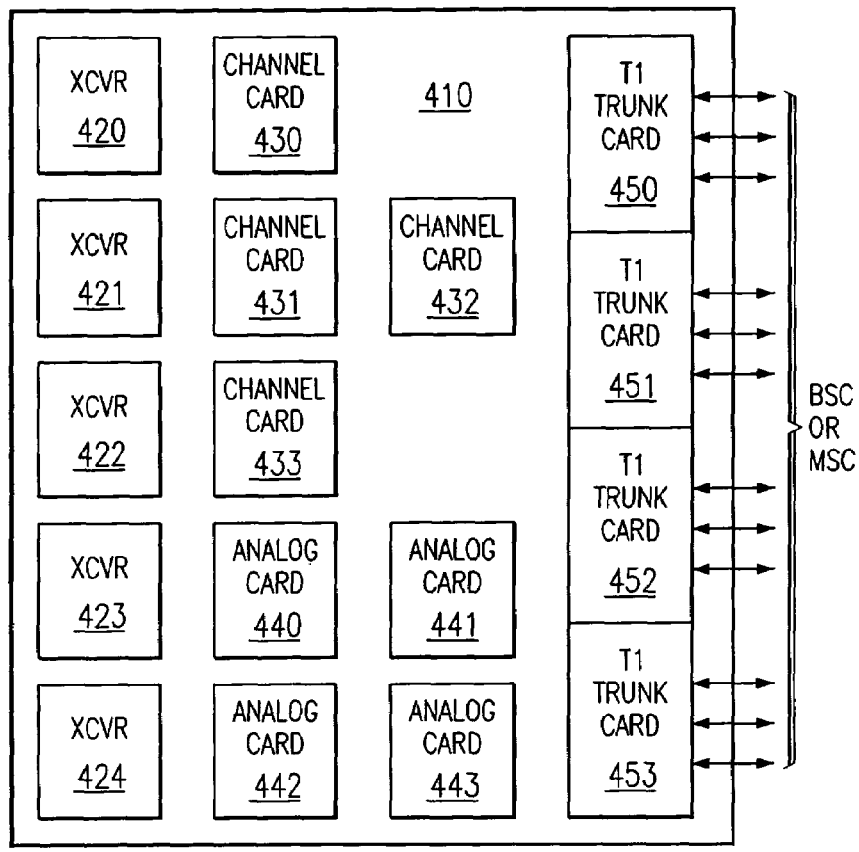
FIG. 4 is a block diagram of a prior art wireless base station.
Figure 6:
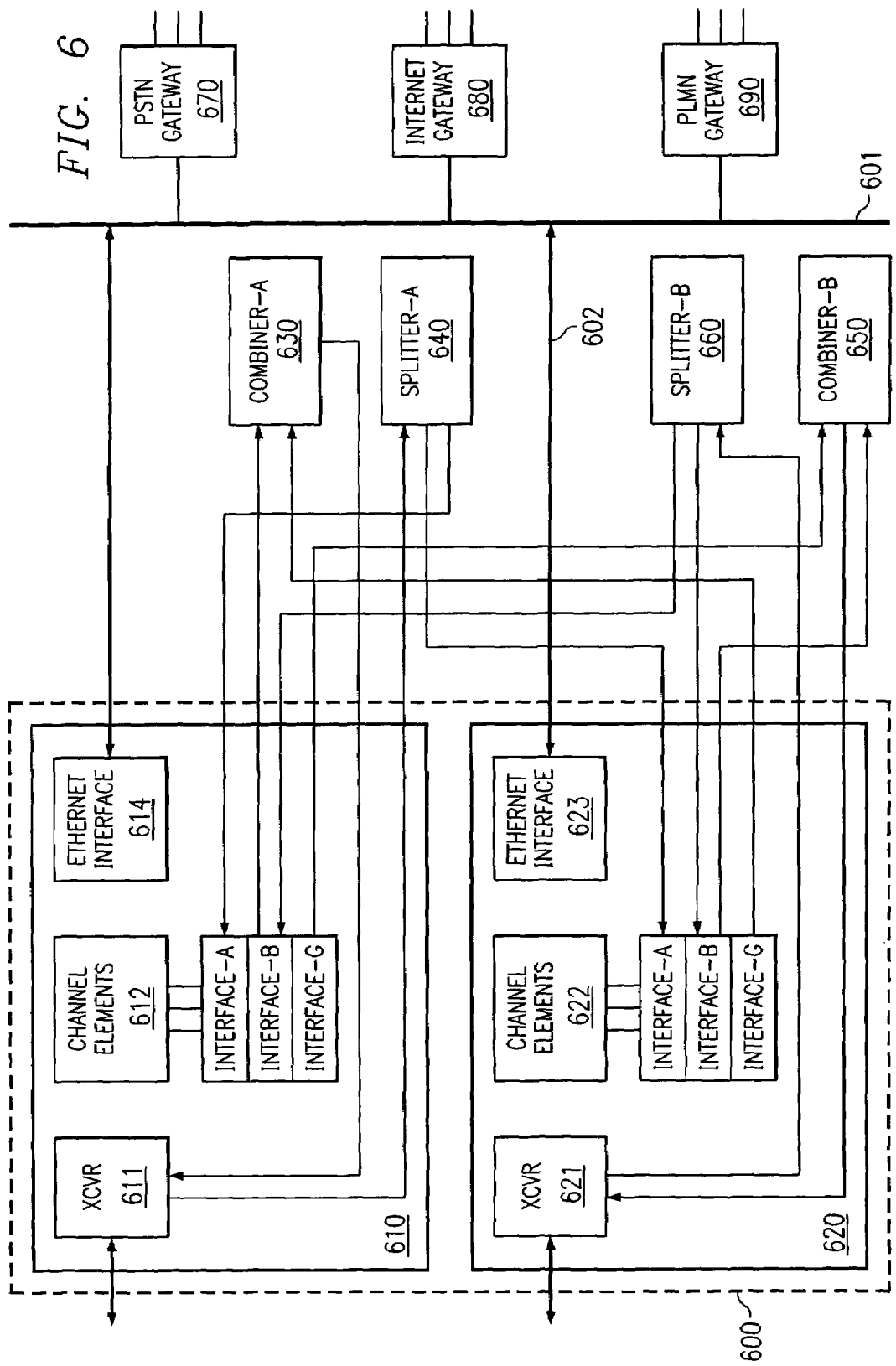
FIG. 6 is a block diagram of an embodiment of a multi-sector base station of the present invention.

FIG. 6 is a block diagram illustration of an exemplary embodiment of a scalable bi-sectored enterprise base station of the present invention. As shown in FIG. 6, base station 600 includes sectors modules 610 and 620. Each of sector modules 610 and 620 is capable of supporting remote mobile terminals within a sectorized coverage area (e.g., the sectors of FIG. 3) with an internet protocol based communication access.

Each of modules 610 and 620 include transceiver units 611 and 621 respectively. Transceiver units 611 and 621 receive and transmit signals between an antenna system and each of the sectorized modules.

Channel elements 612 and 622 are each respectively coupled to handle transmit and receive channel information in the respective sectors (i.e. Sector A or B) based on the remote terminal's measurement of the particular sector's pilot strength.

In the sectorized implementation of the present invention, the task of selecting a particular sector for a mobile terminal to communicate in falls on the base station's channel processing elements. The channel elements 612 and 622 respectively scan the reverse and forward link traffic to identify the strongest path to assign to a requesting terminal within each respective sector.

Referring still to FIG. 6, Ethernet interface cards 614 and 623 are respectively coupled to modules 610 and 620 to enable base station 600 to communicate (e.g., through communication path 602) over an enterprise wide Ethernet back-bone. In the present invention having Ethernet interface cards 614 and 623 incorporated in modules 610 and 620 provides the scalability advantages of base station 600.

Combiners 630 and 650 are respectively coupled to channel elements 612 and 622. In the present invention, combiners 630 and 650 providing channel sharing resources for each module within base station 600 to enable different sector access the same antenna system for soft handoffs.

Splitters 640 and 660 are respectively coupled to each of modules 610 and 620 to handle reverse link communication between modules 610 and 620 and mobile terminals communicating with base station 600.

Still referring to FIG. 6, public switched telephone network (PSTN) gateway 670 is coupled to LAN 601 to facilitate communications between mobile terminals and base station 600 via the PSTN. PSTN gateway 670 includes T1 trunk interface cards to enable connection to the PSTN.

A public switched data network (PSDN) gateway 680 is also shown coupled to LAN 601. PSDN gateway 680 is coupled to provide communication access to base station 600 via the internet. PSDN gateway 680 also includes T1 trunk interface cards to enable base station 600 connection to the internet.

Public land mobile network (PLMN) gateway 690 is also shown coupled to LAN 601. PLMN gateway 690 also includes T1 trunk interface cards. By having T1 trunk interface cards in each of gateways 670, 680 and 690, the present invention provides a cost effective way of implementing sectorized CDMA communication. Gateways 670, 680 and 690 are commercially available, modular and have various capacities. However, the novel approach of the present invention's integration of the T1 trunks in the gateways enables the invention to scale base station 600 with stackable base modules.

Figure 7:
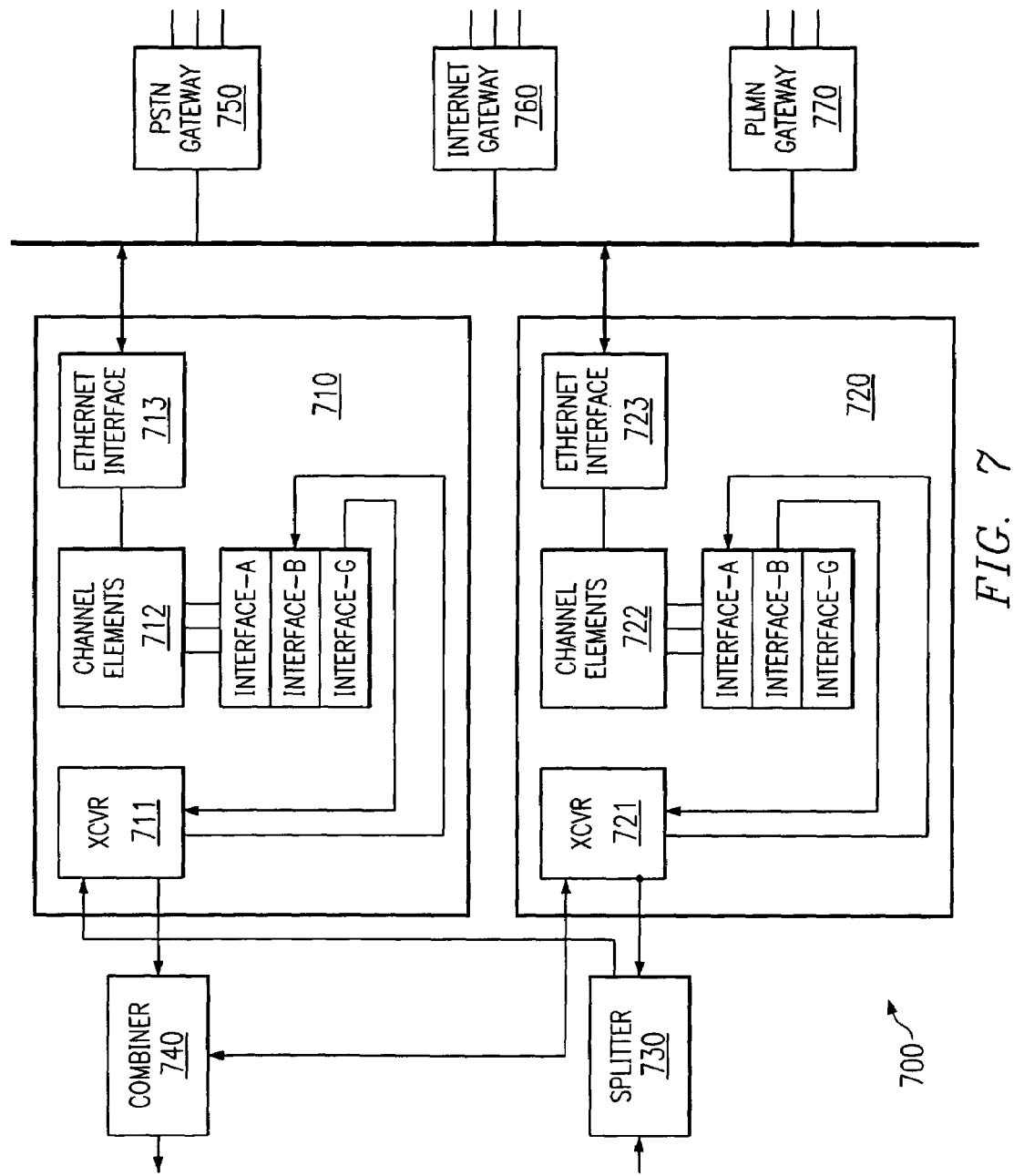
FIG. 7 is a block diagram of an embodiment of a multi-carrier base station of the present invention.

FIG. 7 is a block diagram illustration of an exemplary embodiment of a multi-carrier base station of the present invention. As illustrated in FIG. 7, base station 700 comprises two base modules 710 and 720. Base modules 710 and 720 comprise similar components as those described in FIG. 6 above, such as channel elements 712 and 722 and ethernet interface cards 713 and 723. FIG. 7 also illustrates PSTN gateway 750, internet gateway 760 and PLMN gateway 770 coupled to ethernet interface cards 713 and 723.

A combiner 740 is coupled to base modules 710 and 720 to enable communication with a common antenna system to handle forward link communication between base station 700 and mobile terminals communicating on the network. A splitter 730 is also coupled to the common antenna system to enable communication between transceivers 711 and 721 with the mobile terminals.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. An enterprise code division multiple access (CDMA) wireless communication system, comprising:

a local area network (LAN);
a plurality of scalable wireless base stations coupled to the LAN, the wireless base stations coupled to communicate with wireless devices coupled within the enterprise wireless communication system via an internet protocol;
a public switched data network (PSDN) gateway directly coupled to the LAN to communicate with the wireless devices through at least one of the wireless base stations, the PSDN gateway comprising a T1 trunk interface for communication with a PSDN;
a public switched telephone network (PSTN) gateway directly coupled to the LAN to communicate with the wireless devices through at least one of the wireless base stations, the PSTN gateway comprising a T1 trunk interface for communication with a PSTN;
a public land mobile network (PLMN) gateway directly coupled to the LAN to communicate with the wireless devices through at least one of the wireless base stations, the PLMN gateway comprising a T1 trunk interface for communication with a PLMN;
wherein the scalable wireless base stations each includes stackable base modules each operable to support communication with mobile terminals in a respective sectorized coverage area;
wherein the stackable base modules each further includes a plurality of channel elements coupled to enable the base stations to handle digital communication signals to and from mobile terminals remotely coupled to the base stations;
wherein the stackable base modules each further includes an Ethernet interface card coupled to enable the stackable base modules to handle internet protocol communication signals;
wherein the base stations further include a plurality of combiners coupled to interconnect the plurality of stackable base modules to handle communication requests from remote mobile terminals to the system; and
wherein the base stations further include a plurality of splitters coupled to interconnect the plurality of stackable base modules to handle communications requests from the base stations to remote mobile terminals coupled to the system.

2. The system of claim 1, wherein the stackable wireless base modules each include a transceiver coupled to receive and transmit coded communication signals to and from a remote mobile terminal coupled to the system.

3. The system of claim 1, wherein the PSTN gateway includes a plurality of T1 trunks.

4. The system of claim 1, wherein the PSDN gateway includes a plurality of T1 trunks.

5. A method for providing enterprise code division multiple access (CDMA) in a wireless communication system, comprising:
providing a local area network (LAN);
coupling a plurality of scalable wireless base stations to the LAN, the wireless base stations coupled to communicate with wireless devices coupled within the enterprise wireless communication system via an internet protocol;
directly coupling a public switched data network (PSDN) gateway to the LAN to communicate with the wireless devices through at least one of the wireless base stations, the PSDN gateway comprising a T1 trunk interface for communication with a PSDN;

directly coupling a public switched telephone network (PSTN) gateway to the LAN to communicate with the wireless devices through at least one of the wireless base stations, the PSTN gateway comprising a T1 trunk interface for communication with a PSTN;
directly coupling a public land mobile network (PLMN) gateway to the LAN to communicate with the wireless devices through at least one of the wireless base stations, the PLMN gateway comprising a T1 trunk interface for communication with a PLMN;
wherein the scalable wireless base stations each includes stackable base modules each operable to support communication with mobile terminals in a respective sectorized coverage area;
wherein the stackable base modules each further includes a plurality of channel elements coupled to enable the base stations to handle digital communication signals to and from mobile terminals remotely coupled to the base stations;
wherein the stackable base modules each further includes an Ethernet interface card coupled to enable the stackable base modules to handle internet protocol communication signals;
coupling a plurality of combiners to the base stations to interconnect the plurality of stackable base modules to handle communication requests from remote mobile terminals to the system; and
coupling a plurality of splitters to the base stations to interconnect the plurality of stackable base modules to handle communications requests from the base stations to remote mobile terminals coupled to the system.

6. The method of claim 5, wherein the stackable wireless base modules each include a transceiver coupled to receive and transmit coded communication signals to and from a remote mobile terminal coupled to the system.

7. The method of claim 5, wherein the PSTN gateway includes a plurality of T1 trunks.

8. The method of claim 5, wherein the PSDN gateway includes a plurality of T1 trunks.

9. An enterprise code division multiple access (CDMA) wireless communication system, comprising:
a plurality of base stations for wireless communication with a mobile terminal, each base station operable to communicate with a mobile terminal in a respective coverage area;
wherein each base station is coupled to a local area network (LAN) through an Ethernet backbone;
a public switched data network (PSDN) gateway directly coupled to the LAN to communicate with the mobile terminal through at least one of the plurality of base stations, the PSDN gateway comprising a T1 trunk interface for communication with a PSDN;
a public switched telephone network (PSTN) gateway directly coupled to the LAN to communicate with the mobile terminal through at least one of the wireless base stations, the PSTN gateway comprising a T1 trunk interface for communication with a PSTN;
a public land mobile network (PLMN) gateway directly coupled to the LAN to communicate with the mobile terminal through at least one of the wireless base stations, the PSDN gateway comprising a T1 trunk interface for communication with a PLMN;
each of the plurality of base stations comprising a plurality of base modules, each base module operable to communicate with the mobile terminal in a respective sector of the respective coverage area of the base station, each base module comprising:

a transceiver for communicating with the mobile terminal;

an ethernet interface coupled to the LAN operable to enable the stackable base modules to handle internet protocol communication signals; and channel elements to handle digital communication signals to and from the mobile terminal;

wherein the base stations include a plurality of combiners coupled to interconnect the base modules to handle communications requests from the mobile terminal; and wherein the base stations include a plurality of splitters coupled to interconnect the base modules to handle communications requests from the base stations to the mobile terminal.

10. The system of claim 9, wherein the PSTN gateway includes a plurality of T1 trunks.

11. The system of claim 9, wherein the PSDN gateway includes a plurality of T1 trunks.

* * * * *